US011199057B2

(12) United States Patent
Chalumeau

(10) Patent No.: US 11,199,057 B2
(45) Date of Patent: Dec. 14, 2021

(54) HIGH-STRENGTH FLEXIBLE TUBULAR STRUCTURE FOR OIL EXPLOITATION

(71) Applicant: TECHNIP FRANCE, Courbevoie (FR)

(72) Inventor: Alain Chalumeau, Notre-Dame-de-Bondeville (FR)

(73) Assignee: TECHNIP FRANCE ( * ) Notice: Subject to any disclaimer, the term of this patent is extended or adjusted under 35 U.S.C. 154(b) by 741 days.

(21) Appl. No.: 14/381,256

(22) PCT Filed: Feb. 26, 2013

(86) PCT No.: PCT/FR2013/050391
§ 371 (c)(1),
(2) Date: Aug. 27, 2014

(87) PCT Pub. No.: WO2013/128110
PCT Pub. Date: Sep. 6, 2013

(65) Prior Publication Data
US 2015/0041118 A1 Feb. 12, 2015

(30) Foreign Application Priority Data
Mar. 1, 2012 (FR) .................................. 1251910

(51) Int. Cl.
C09B 7/00 (2006.01)
E21B 17/20 (2006.01)
(Continued)

(52) U.S. Cl.
CPC ............ *E21B 17/20* (2013.01); *B29C 48/022* (2019.02); *B29C 48/21* (2019.02); *B32B 1/08* (2013.01);
(Continued)

(58) Field of Classification Search
CPC .......... C08F 14/08; C08L 27/16; E21B 17/00; B29L 2009/003
(Continued)

(56) References Cited

U.S. PATENT DOCUMENTS

| 5,601,893 A | 2/1997 | Strassel et al. |
| 6,102,077 A | 8/2000 | Legallais et al. |
| 2009/0124748 A1* | 5/2009 | Baert ...................... C08L 27/06 524/502 |

FOREIGN PATENT DOCUMENTS

| EP | 0 608 939 A1 | 8/1994 |
| EP | 1 342 752 A1 | 9/2003 |

(Continued)

OTHER PUBLICATIONS

International Search Report dated May 29, 2013 issued in corresponding International patent application No. PCT/FR2013/050391.
(Continued)

Primary Examiner — Ellen S Hock
(74) Attorney, Agent, or Firm — Ostrolenk Faber LLP

(57) ABSTRACT

A flexible tubular structure for oil exploitation, said flexible tubular structure having at least one reinforcing layer and at least one layer of a fluoropolymer compound, wherein said fluoropolymer compound has a composition including a polyvinylidene fluoride homopolymer and a vinylidene fluoride/fluorinated comonomer copolymer, and a plasticizer. The proportion by weight of hexafluoropropylene monomer in the copolymer is greater than 25%.

16 Claims, 1 Drawing Sheet

(51) Int. Cl.
| | |
|---|---|
| *B29C 48/21* | (2019.01) |
| *B29C 48/00* | (2019.01) |
| *B32B 1/08* | (2006.01) |
| *C08L 27/16* | (2006.01) |
| *F16L 11/08* | (2006.01) |
| *B32B 27/30* | (2006.01) |
| *B32B 27/22* | (2006.01) |
| *B32B 27/34* | (2006.01) |
| *B32B 15/08* | (2006.01) |
| *B32B 27/32* | (2006.01) |
| *B32B 27/08* | (2006.01) |
| *B32B 27/20* | (2006.01) |
| *C08K 5/12* | (2006.01) |
| *C08K 5/11* | (2006.01) |
| *B29K 27/00* | (2006.01) |
| *B29K 105/00* | (2006.01) |
| *B29K 705/00* | (2006.01) |
| *B29L 9/00* | (2006.01) |
| *B29L 23/00* | (2006.01) |

(52) U.S. Cl.
CPC .............. *B32B 15/08* (2013.01); *B32B 27/08* (2013.01); *B32B 27/20* (2013.01); *B32B 27/22* (2013.01); *B32B 27/304* (2013.01); *B32B 27/32* (2013.01); *B32B 27/34* (2013.01); *C08K 5/12* (2013.01); *C08L 27/16* (2013.01); *F16L 11/083* (2013.01); *B29K 2027/16* (2013.01); *B29K 2105/0038* (2013.01); *B29K 2105/0085* (2013.01); *B29K 2705/00* (2013.01); *B29L 2009/003* (2013.01); *B29L 2023/005* (2013.01); *B32B 2264/102* (2013.01); *B32B 2264/104* (2013.01); *B32B 2307/4026* (2013.01); *B32B 2307/714* (2013.01); *B32B 2597/00* (2013.01); *C08K 5/11* (2013.01); *C08L 2205/025* (2013.01)

(58) Field of Classification Search
USPC .............................. 428/34.1, 35.7; 524/306
See application file for complete search history.

(56) References Cited

FOREIGN PATENT DOCUMENTS

| | | | |
|---|---|---|---|
| FR | 2 877 009 A1 | | 4/2006 |
| WO | WO9626980 | * | 9/1996 |
| WO | WO 03/062691 A1 | | 7/2003 |

OTHER PUBLICATIONS

Written Opinion dated May 29, 2013 issued in corresponding International patent application No. PCT/FR2013/050391.
Pianca M et al.: "Composition and sequence distribution of vinylidene fluoride copolymer and terpolymer fluoroelastomers. Determination by <19F> nuclear magnetic resonance spectroscopy and correlation with some properties", Polymer, Elsevier Science Publishers, B.V, GB, vol. 28, No. 2, Feb. 1, 1987, pp. 224-230, XP024118462.
Final Search Report dated Oct. 1, 2012 issued in corresponding French application No. 1251910.
"Encyclopedia of Polymer Science and Engineering", Wiley & Sons (1989) pp. 568-569 and pp. 588-593.

* cited by examiner

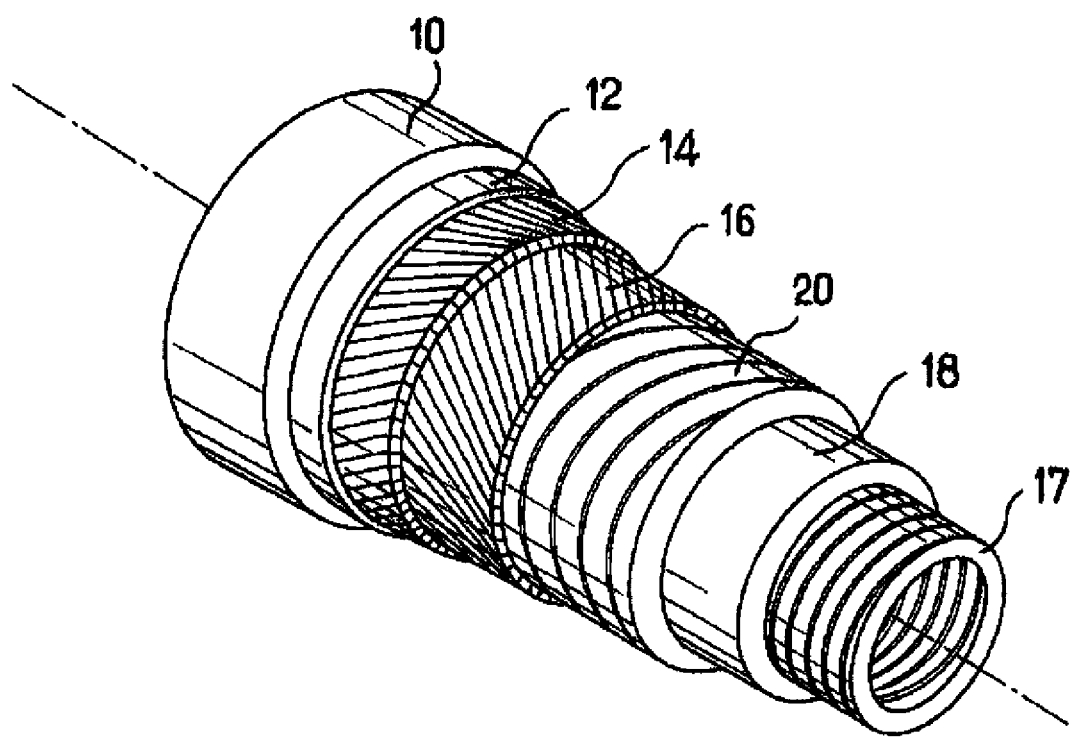

HIGH-STRENGTH FLEXIBLE TUBULAR STRUCTURE FOR OIL EXPLOITATION

CROSS-REFERENCE TO RELATED APPLICATIONS

The present application is a 35 U.S.C. §§ 371 national phase conversion of PCT/FR2013/050391, filed Feb. 26, 2013, which claims priority of French Application No. 1251910, filed Mar. 1, 2012, the contents of which are incorporated by reference herein. The PCT International Application was published in the French language.

TECHNICAL FIELD OF THE INVENTION

The present invention relates to a flexible tubular structure for oil exploitation comprising a reinforcing layer and a layer of a fluoropolymer compound.

BACKGROUND OF THE INVENTION

One field of application envisaged is notably the transport of fluids for offshore and onshore oil exploitation.

The term "flexible tubular structure" denotes both offshore and onshore flexible pipes used for oil or gas exploitation, subsea umbilicals and structures combining the functions of flexible pipes and subsea umbilicals.

Offshore flexible pipes serve essentially for transporting the oil or gas extracted from an offshore deposit. They may also be used for transporting pressurized seawater intended to be injected into the deposit in order to increase the production of hydrocarbons.

These flexible pipes are formed from an assembly of different layers, each intended to allow the pipe to withstand the offshore service or installation stresses. These layers notably comprise polymer sheaths and reinforcing layers formed by windings of shaped metal wires, of strips or of wires of composite material.

Flexible tubular pipes generally comprise, from the inside to the outside, at least one inner watertight tube intended to convey the fluid being transported, reinforcing layers around the inner watertight tube, and an external protective sheath around the reinforcing layers. The inner watertight tube generally consists of a polymer material and it is designated either as "inner watertight sheath" or as "pressure sheath".

These flexible pipes are described in the standards documents published by the American Petroleum Institute (API), API 17J "Specification for Unbonded Flexible Pipe" and API RP 17B "Recommended Practice for Flexible Pipe".

The onshore flexible pipes to which the present invention relates are mainly those used for well drilling and control, notably the choke lines and kill lines described in the standard API 16C "Choke and Kill Systems" published by the American Petroleum Institute. These safety pipes, which are connected to the devices for wellhead sealing and control, must be able to withstand extreme conditions of pressure and temperature, typically 1000 bar and 130° C. They generally have a structure similar to that of the offshore flexible pipes.

The invention also relates to the onshore flexible pipes described in the standard API RP 15S "Qualification of Spoolable Reinforced Plastic Line Pipe" published by the American Petroleum Institute. These onshore flexible pipes are known by a person skilled in the art by the English name "Reinforced Thermoplastic Pipe". They are used for transporting oil and gas under pressure, typically up to 150 bar. Their structure is similar to that of the offshore flexible pipes.

Subsea umbilicals mainly serve for transporting fluids, power and signals to offshore equipment, such as valves, wellheads, collectors, pumps or separators, for the purpose of supplying power and for remote monitoring and control of the actuators of this equipment. The fluids transported for these applications are generally oils for hydraulic operation. The subsea umbilicals may also serve for transporting various fluids intended to be injected into a main pipeline for transporting a hydrocarbon, with a view to facilitating the flow of said hydrocarbon, for example by injecting chemicals with the aim of preventing the formation of plugs of hydrates, or methane facilitating bringing the oil to the surface ("gas lift" method), or for providing maintenance of said main pipeline, for example by injecting corrosion inhibitors.

A subsea umbilical consists of an assembly of one or more watertight pipes, and optionally electric cables and/or optical-fiber cables, said assembly being produced by helicoidal or S/Z winding of said tubes and cables, in such a way that the umbilical is flexible, and the assembly may be surrounded by reinforcing layers and an outer protective polymer sheath. These watertight pipes, which have the function of transporting the aforementioned fluids, generally have a diameter much smaller than the outside diameter of the umbilical. A watertight pipe of an umbilical generally consists of either a simple nonoxidizing metal tube, or a reinforced flexible pipe comprising an impervious polymer tube surrounded by one or more reinforcing layers.

Subsea umbilicals of this kind are described in standard API 17E "Specification for Subsea Umbilicals" published by the American Petroleum Institute, as well as in standard ISO 13628-5.

Document U.S. Pat. No. 6,102,077 discloses a flexible tubular structure combining the functions of a subsea flexible pipe and a subsea umbilical. This structure comprises at its center a flexible pipe of large diameter used for transporting the hydrocarbons, said central flexible pipe being surrounded by a plurality of peripheral pipes of small diameter with helicoidal or S/Z assembly around the central flexible pipe, said peripheral pipes being used for functions similar to those of the umbilicals, notably for hydraulic drives or for injection of fluids. These flexible tubular structures are known by a person skilled in the art by the names "Integrated Subsea Umbilical" and "Integrated Production Bundle". These structures of large diameter are generally surrounded by an outer polymer sheath.

Document EP 0608939 describes polymer compositions based on fluoropolymers for supplying fluoropolymer compounds for producing flexible tubular structures for oil exploitation. These tubular structures comprise at least one reinforcing layer and at least one layer of a fluoropolymer compound. The compositions comprise, by weight, from 60 to 80% of PVDF, from 20 to 40% of a thermoplastic copolymer of VDF and of another fluorinated comonomer (present at a level from 5 to 25% in the copolymer), and from 5 to 20% of a plasticizer (relative to the sum of PVDF and of copolymer). The thermoplastic copolymers envisaged include VDF/HFP copolymers. The stated contents of HFP in the copolymers that are disclosed in the examples are of the order of 10%.

However, the fluoropolymer compounds of the tubular structures produced with such compositions are not entirely satisfactory. In particular, when the structures are subjected to repeated movements due to the sea currents, the fatigue strength of these fluoropolymer compounds is judged to be inadequate. Moreover, when these tubular structures are laid at great depth where the temperature is low, but the fluid passing through them is at a relatively high temperature, these pipes do not have an adequate service life.

Thus, a problem that arises and that the present invention aims to solve is to supply a flexible tubular structure for oil exploitation comprising a fluoropolymer compound having not only improved mechanical, thermal and chemical properties, but also properties that do not change over the life of the pipe in service.

SUMMARY OF THE INVENTION

For this purpose, the present invention proposes a flexible tubular structure for oil exploitation, said flexible tubular structure comprising at least one reinforcing layer and at least one layer of a fluoropolymer compound, said fluoropolymer compound having a composition comprising on the one hand a poly(vinylidene fluoride) homopolymer and a copolymer of vinylidene fluoride and of a fluorinated comonomer and on the other hand a plasticizer; according to the invention, the proportion by weight of fluorinated comonomer in the copolymer is above 25%.

Thus, a characteristic feature of the invention is the use of a copolymer in which the proportion by weight of fluorinated comonomer is above 25%. Preferably, said fluorinated comonomer is selected from: hexafluoropropylene (HFP), perfluoro(methylvinyl)ether (PMVE), perfluoro(ethylvinyl)ether (PEVE), perfluoro(propylvinyl)ether (PPVE), tetrafluoroethylene (TFE) or perfluorobutylethylene (PFBE), chlorotrifluoroethylene (CTFE), fluoroethylenepropylene (FEP) or trifluoroethylene.

Moreover, the copolymer may also be a terpolymer.

According to a preferred embodiment, the fluorinated comonomer is hexafluoropropylene.

Thus, the copolymer has elastomeric properties that it imparts to the fluoropolymer compound, making it possible not only to increase the fatigue strength of said compound, but also to improve the low-temperature strength. Moreover, the service life of the flexible tubular structures thus obtained is increased.

This is the essential difference from the object of document EP 0608939, where precisely compositions are sought that are able to form nonelastomeric fluoropolymer compounds.

According to a particularly advantageous embodiment of the invention, said copolymer of vinylidene fluoride and of said fluorinated comonomer is present in said composition in a proportion by weight from 10 to 35%. Thus, said copolymer is an elastomer, and it can endow the fluoropolymer compound with even more pronounced elastomeric properties, and thus make it possible to produce a flexible tubular structure having an even more improved service life.

Preferably, said copolymer of vinylidene fluoride and of said fluorinated comonomer is present in said composition in a proportion by weight from 20 to 35%, and for example between 25% and 35%.

According to another embodiment of the invention, said plasticizer is selected from dibutyl sebacate, dioctyl phthalate, N-n-butylsulfonamide, the polymeric polyesters and combinations thereof, and, for example, the plasticizer is dibutyl sebacate. This set of plasticizers exhibits less exudation than the others with respect to the plastic material of the compound. Said plasticizer is advantageously present in said composition in a proportion by weight from 1 to 5%, for example from 2 to 3.5%.

Moreover, according to a particularly advantageous feature of the invention, the proportion by weight of said fluorinated comonomer in said copolymer is: greater than or equal to 26%, and/or less than or equal to 40%, preferably less than or equal to 37%. This prevents hot creep of the compound in the metallic elements of the reinforcing layer.

Moreover, said fluoropolymer compound of the flexible tubular structure preferably has a fatigue strength in the unaged state greater than or equal to 50000 cycles, preferably greater than or equal to 100000 cycles on average and/or a fatigue strength in the state as aged for 1 month at 150° C. in air, greater than or equal to 5000 cycles, preferably greater than or equal to 8000 cycles on average. Thus, the fatigue strength of the fluoropolymer compound being improved, the flexible tubular structure maintains all its properties—chemical, thermal and mechanical—for a longer time.

According to another particularly advantageous feature of the invention, said fluoropolymer composition consists of said poly(vinylidene fluoride) homopolymer, said copolymer of vinylidene fluoride and of said fluorinated comonomer and said plasticizer. Thus, the polymer composition comprises exclusively those elements that endow it with the required properties.

Moreover, according to a first embodiment of the invention, said layer of said fluoropolymer compound forms a pressure sheath, whereas said reinforcing layer comprises profiles wound helically around said pressure sheath. According to a second embodiment of the invention, said layer of said fluoropolymer compound is formed from strips of said fluoropolymer compound wound in a helix. Also, according to a first embodiment according to this second variant, the flexible tubular structure advantageously comprises two reinforcing layers, whereas said strips of said fluoropolymer compound are wound helically between said two reinforcing layers. According to a second embodiment, it comprises a pressure sheath and a metal carcass located inside said pressure sheath, whereas said strips of said fluoropolymer compound are wound helically between said carcass and said pressure sheath.

According to a variant of the invention, the flexible tubular structure of the invention comprises several adjacent polymer layers, at least one of which is formed by the layer of fluoropolymer compound having a composition comprising on the one hand a poly(vinylidene fluoride) homopolymer and a copolymer of vinylidene fluoride and of hexafluoropropylene and on the other hand a plasticizer; the proportion by weight of hexafluoropropylene monomer in the copolymer being above 25%.

According to another aspect, the present invention relates to a method of manufacturing a flexible tubular structure for oil exploitation, said method being of the type according to which a composition is supplied comprising on the one hand a poly(vinylidene fluoride) homopolymer and a copolymer of vinylidene fluoride and of a fluorinated comonomer and on the other hand a plasticizer, and a reinforcing layer and a layer of said fluoropolymer compound are formed to combine said layers; according to the invention, a composition is supplied in which the proportion by weight of monomer and of fluorinated comonomer in the copolymer is above 25%. Preferably, the fluorinated comonomer is hexafluoropropylene.

BRIEF DESCRIPTION OF THE DRAWINGS

Other particular features and advantages of the invention will become clear on reading the description of particular embodiments of the invention given below, for purposes of illustration but not limiting, referring to the single appended drawing in which:

the single FIGURE is a partial perspective schematic view of a flexible structure according to the invention.

DESCRIPTION OF AN EMBODIMENT

The single FIGURE illustrates a type of flexible tubular structure according to the invention. This structure is that of a pipe intended precisely for transporting hydrocarbons in a marine environment. It comprises, from outside to inside, an outer protective sheath 10, called outer sheath; a holding layer 12 wound around an outer tensile armor layer 14, an inner tensile armor layer 16 wound in the direction opposite to the outer layer 14, a pressure armor layer 20 to take the radial stresses generated by the pressure of the fluid being transported, an inner watertight polymer sheath 18 and an inner carcass 17 to take the radial crushing stresses. Owing to the presence of the inner carcass 17, this pipe is called "rough bore".

The inner watertight polymer sheath 18 or pressure sheath is intended for conveying the hydrocarbon internally, in a watertight manner. This pressure sheath 18 is therefore surrounded by a pressure armor layer 20 formed from a short-pitch winding of a wire of stapled metal shape and intended to take the internal pressure stresses with the pressure sheath 18. The tensile armor layers 14, 16 are wound with long pitch and they are intended to take the longitudinal tensile stresses to which the pipe is subjected.

According to the invention, the flexible tubular structure comprises at least one reinforcing layer and a layer of fluoropolymer compound having a composition comprising on the one hand a poly(vinylidene fluoride) homopolymer (PVDF) and a copolymer of vinylidene fluoride (VDF) and of hexafluoropropylene (HFP) and on the other hand a plasticizer; the proportion by weight of hexafluoropropylene monomer in the copolymer being above 25%.

This pressure sheath of the flexible tubular structure may be adjacent to other polymer layers, which may be made of polymers such as polyamide (PA), polyethylene (PE) or a poly(vinylidene fluoride) (PVDF), optionally with fillers.

According to a variant, said layer of said fluoropolymer compound forms an intermediate protective sheath. Thus, the layer of fluoropolymer compound of the flexible tubular structure of the invention is not the inner watertight sheath but another sheath of the structure such as for example an intermediate sheath or a sacrificial sheath. A sacrificial sheath is a sheath located underneath a watertight sheath and which protects the integrity of said watertight sheath during manufacture and/or during operation of the flexible tubular structure in service.

According to a preferred embodiment of the invention, it is the pressure sheath 18 of the flexible tubular structure that is the layer of fluoropolymer compound having a composition comprising on the one hand a poly(vinylidene fluoride) homopolymer (PVDF) and a copolymer of vinylidene fluoride (VDF) and of hexafluoropropylene (HFP) and on the other hand a plasticizer; the proportion by weight of hexafluoropropylene monomer in the copolymer being above 25%.

The PVDF polymer used in the context of the invention preferably has a hot melt flow index less than or equal to 15 g/10 min, advantageously less than or equal to 10 g/10 min, and ideally less than or equal to 5 g/10 min, according to standard ISO 1133 (230° C., 12.5 kg), in order to guarantee good mechanical strength properties.

The VDF/HFP copolymer used in the context of the invention is preferably an elastomer, which is defined by the ASTM in Special Technical Publication No. 184 as a material that can be stretched at room temperature to twice its initial length and which, once released, quickly regains its initial length, to within 10%.

The VDF/HFP copolymer is obtained by copolymerization of VDF monomers and HFP monomers. It was found that the VDF/HFP copolymers are thermoplastic at low contents of HFP, and are elastomers at high contents of HFP. In the context of the invention, the level or proportion by weight of HFP monomers is above 25%.

According to certain embodiments, the proportion by weight of HFP monomers is greater than or equal to 26%, or to 27%, or to 28%, or to 29%, or to 30%, or to 31%, or to 32%, or to 33%, or to 34%, or to 35%, or to 36%, or to 37%, or to 38%, or to 39%.

According to certain embodiments, the proportion by weight of HFP monomers is less than or equal to 40%, or to 39%, or to 38%, or to 37%, or to 36%, or to 35%, or to 34%, or to 33%, or to 32%, or to 31%, or to 30%, or to 29%, or to 28%, or to 27%, or to 26%.

The proportion by weight of HFP in the copolymer is preferably determined by nuclear magnetic resonance. We may notably use the following method of $^{19}F$ NMR.

The samples of copolymer are dissolved in an NMR tube with diameter of 5 mm. The samples of copolymer containing more than 10 wt % of HFP are dissolved in acetone-d6 at 55° C. An amount of copolymer (about 10 mg) is put in a tube and solvent is added to fill 5.5 cm of the tube (about 0.75 ml of solvent). A heating block is used for heating the samples to the desired temperature. The samples are heated for at least one hour until the solid has dissolved and the gel has disappeared. The tubes are inverted to check for absence of gel.

The spectra are acquired on a spectrometer of the Bruker DMX or Varian Mercury 300 type, operating at 55° C. in the case of the solvent acetone-d6, and are analyzed according to the method described in "*Composition and sequence distribution of vinylidene fluoride copolymer and terpolymer fluoroelastomers. Determination by* 19F NMR spectroscopy and correlation with some properties". M. Pianca et al., *Polymer,* 1987, Vol. 28, 224-230. The accuracy of the measurements is verified by measuring the integrals of $CF_3$ and of CF and comparing them to see if they are indeed in a ratio of 3 to 1.

Preferably, the copolymer used for preparing the composition intended to form the fluoropolymer compound of the flexible tubular structure is essentially free from homopolymer.

The copolymer may be manufactured by the method described in the work of M. Pianca et al. cited above.

Plasticizers in the sense of the invention are the compounds defined in the work *Encyclopedia of Polymer Science and Engineering,* published by Wiley & Sons (1989), p. 568-569 and p. 588-593. They may be monomeric or polymeric. We may notably mention dibutyl sebacate, dioctyl phthalate, N-n-butylsulfonamide, the polymeric polyesters and combinations thereof. Suitable polymeric polyesters are notably those derived from adipic, azelaic or sebacic acids and diols, and combinations thereof, the molecular weight preferably being greater than or equal to 1500, more particularly greater than or equal to 1800, and preferably less than or equal to 5000, and more particularly less than or equal to 2500. Plasticizers of excessive molecular weight would lead to a composition whose impact strength is too low.

Dibutyl sebacate is a particularly advantageous plasticizer.

The presence of the plasticizer facilitates manufacture of the composition or processing thereof for making the layer of fluoropolymer compound of the flexible tubular structure. It also improves the impact strength of the fluoropolymer compound.

Besides the PVDF, copolymer and plasticizer, the composition of the fluoropolymer compound may comprise various additives and/or fillers and/or electrically conducting particles and/or mineral or organic pigments or dyes.

Among the possible fillers, we may mention, non-exhaustively, mica, alumina, talc, carbon black, glass fibers, macromolecular compounds and calcium carbonate as well as metal oxide fillers selected from the group consisting of $Fe_2O_3$, PbO, ZnO, NiO, CoO, CdO, CuO, $SnO_2$, $MoO_3$, $Fe_3O_4$, $Ag_2O$, $CrO_2$, $CrO_3$, $Cr_2O_3$, TiO, $TiO_2$ and $Ti_2O_3$, the alkali-metal and alkaline-earth oxides selected from CaO, $Ca(OH)_2$ and MgO.

Among other possible additives, we may mention, non-exhaustively, UV stabilizers (preferably apart from agents of the IRGANOX® type), fireproofing products, thermal stabilizers, and manufacturing aids (preferably with the exception of polyolefins and notably of polymers based on ethylene).

When they are present, the above compounds, other than PVDF, the copolymer and the plasticizer, are present at a level of 20% at most, preferably 15% at most, or 10% at most, or 7% at most, or 5% at most, or 3% at most, or 2% at most, or 1% at most (in proportion by weight relative to the total composition).

According to another embodiment of the flexible tubular structure of the invention, a composition leading to the fluoropolymer compound consists essentially of PVDF, copolymer and plasticizer, or even consists of PVDF, copolymer and plasticizer exclusively.

The content by weight of copolymer in the composition is from 10 to 35%, notably from 20 to 35%, and preferably from 25 to 35%.

According to certain embodiments, the content by weight of copolymer in the composition is greater than or equal to 11%, or to 12%, or to 13%, or to 14%, or to 15%, or to 16%, or to 17%, or to 18%, or to 19%, or to 20%, or to 21%, or to 22%, or to 23%, or to 24%, or to 25%, or to 26%, or to 27%, or to 28%, or to 29%, or to 30%, or to 31%, or to 32%, or to 33%, or to 34%.

According to certain embodiments, the content by weight of copolymer in the composition is less than or equal to 34%, or to 33%, or to 32%, or to 31%, or to 30%, or to 29%, or to 28%, or to 27%, or to 26%, or to 25%, or to 24%, or to 23%, or to 22%, or to 21%, or to 20%, or to 19%, or to 18%, or to 17%, or to 16%, or to 15%, or to 14%, or to 13%, or to 12%, or to 11%.

The content by weight of plasticizer in the final composition of the layer of fluoropolymer compound of the flexible tubular structure is preferably from 1 to 5%, in particular from 2 to 3.5%. An excessive amount of plasticizer leads to an undesirable volume change of the composition, through exudation of the plasticizer.

The fluoropolymer compound of the flexible tubular structure obtained is according to the aforementioned composition is tested by the fatigue test described in document WO 2010/026356. It consists of determining, for a given specimen of polymer composition, the number of cycles to rupture (designated NCR), i.e. the number of cycles after which specimen rupture occurs. The higher the value of NCR, the better the result of the fatigue test.

To perform a fatigue test, axisymmetric test specimens are cut out of the thickness of an extruded tube, with a notch radius of curvature of 4 mm and a minimum radius of 2 mm. These test specimens are considered to be representative of the local geometry of the tube. Cutting is carried out using a servohydraulic dynamometer, for example of type MTS 810. The distance between the jaws is 10 mm. The test specimen is subjected to a maximum elongation of 1.4 mm and a ratio of minimum elongation to maximum elongation of 0.21, which corresponds to a minimum elongation of 0.3 mm, with a sinusoidal signal having a frequency of 1 Hz. The test result (NCR) is the mean value of the results obtained on 10 test specimens.

To perform a hot creep test, a tensile test is carried out according to standard ISO 527 (test specimens of type 1A at a speed of 50 mm/min) on unaged specimens of the polymer composition, with conditioning of these test specimens at the test temperature of 130° C., for 20 minutes before the test. The threshold stress of these test specimens corresponds to the maximum nominal stress that the test specimens withstand in tension. The higher the stress, the better the creep strength of the polymer composition.

EXAMPLE

Compositions are prepared from the following compounds:

Kynar® 400: PVDF bimodal homopolymer marketed by Arkema.

Fluorinated copolymer A: VDF-HFP copolymer (35 wt % of HFP) having a melt viscosity of 3200 Pa·s under 100 $s^{-1}$ at 230° C., Fluorinated copolymer B: VDF-HFP copolymer (25 wt % of HFP) having a melt viscosity of 1800 Pa·s under 100 $s^{-1}$ at 230° C., Kynarflex® 2750: VDF-HFP copolymer (15 wt % of HFP) having a melt viscosity of 2250 Pa·s under 100 $s^{-1}$ at 230° C., marketed by Arkema.

DBS: dibutyl sebacate (plasticizer).

Five compositions are tested, a formulation 1 and four for comparison, formulations 2 to 5. The properties of the compounds obtained according to these compositions are measured, and notably the fatigue strength (according to the NCR test described above, both on aged and unaged samples) and the creep strength (according to the test described above). The results are presented in the table given below. "ND" signifies that the respective measurements were not carried out.

It can be seen that formulation 1 gives exceptionally good results for fatigue strength. The creep strength is also excellent. Other tests, with measurement of the ductile—brittle transition temperature, also demonstrated excellent performance of the fluoropolymer compound.

Comparison of examples 1 and 2 shows that the choice of copolymer A makes it possible to obtain better results in the new and aged state.

With aging for 30 days at 150° C., there are no physico-chemical changes of the PVDF matrix or of the fluorinated copolymer: aging has no effect on the molecular weight of the components or on the crystallinity of the matrix, whether we are considering the degree of crystallinity or the crystal morphology. The only change in the materials making up examples 1 and 2, caused by aging, is loss of plasticizer after holding for 30 days at 150° C. in the air. Thus, comparison of the results in the new and aged state in examples 1 and 2 reveals the beneficial effect of the presence of the plasticizer (new state vs aged state) on the fatigue strength properties.

On comparing examples 5 and 2, it can be seen that formulation 5 without plasticizer has lower strength than formulation 2 in the aged state. In both cases (example 2 aged and example 5 new state), the materials do not (or no longer) possess plasticizer. Moreover, their formulation is similar in terms of the proportion and nature of the copolymer used. However, the properties in the new state in example 5 are clearly lower than those in example 2 in the aged state: this difference is explained by the fact that in the case of example 5, the presence of extrusion defects and microcracks was observed, which are not present in the case of formulation 2 (which contained plasticizer in the initial state) and the presence of these microcracks greatly affects the fatigue strength of the material. In fact, a person skilled in the art knows that the fatigue strength of materials, whatever they are, is highly dependent on the extent to which there are defects in the material. It should be noted that this type of defect or microcrack is not observable in any of the other formulations containing plasticizer: thus, this clearly demonstrates another essential beneficial effect of the plasticizer, on the fatigue strength, namely the possibility of extruding thick parts (with a thickness of at least 3 mm) of quality and without defects.

Comparison of examples 1 and 3 shows the advantage of using a high enough level of copolymer of type A, as the level present in formulation 3 is clearly insufficient.

Finally, comparison of examples 1 and 2 with example 4 shows the advantage of using a fluorinated copolymer comprising a level of comonomer that is high enough to produce a significant improvement in the fatigue properties. Thus, in formulation 4, although the level of copolymer is close to that of examples 1 and 2 and this formulation contains plasticizer, it has a low fatigue strength.

TABLE

| Formulation | Composition (wt %) | NCR (test specimen R4-1 Hz at −10° C.) Not aged | NCR (test specimen R4-1 Hz at −10° C.) Aged 30 days at 150° C. in air | Creep strength threshold tensile stress at 130° C. [MPa] |
|---|---|---|---|---|
| 1 (inv.) | 71% Kynar ® 400 + 3% DBS + 26% fluorinated copolymer A | >146000 | 14800 | 9.1 |
| 2 (comp.) | 68% Kynar ® 400 + 3% DBS + 29% fluorinated copolymer B | 22100 | 3600 | 7.3 |
| 3 (comp.) | 92% Kynar ® 400 + 3% DBS + 5% fluorinated copolymer A | 1000 | 200 | ND |
| 4 (comp.) | 77% Kynar ® 400 + 3% DBS + 20% Kynarflex ® 2750 | 515 | ND | ND |
| 5 (comp.) | 75% Kynar ® 400 + 25% fluorinated copolymer B | 300 | ND | 10 |

The composition according to formulation 1 is the best candidate for forming layers of fluoropolymer compound of a flexible tubular structure intended for oil exploitation.

The present invention also relates to a method of manufacturing a flexible tubular structure according to the invention. For this purpose, according to a first embodiment, an extruder is employed that has one feed screw, which has a feed hopper at one end, and at the other end, an injection nozzle connected to a crosshead through which a line can pass. Taking the example of the flexible tubular pipe illustrated in the single FIGURE, the aforementioned line then corresponds to the carcass. It is fed from upstream of the crosshead to downstream. The composition resulting from formulation 1 is conditioned in the form of granules, which are put in the feed hopper. They are then heated and softened within the feed screw so that they aggregate and form a single phase of the softened composition, which is fed toward the crosshead, which is designed to form a cylindrical layer of the softened composition on and around the carcass.

Further downstream of the crosshead, the carcass coated with the cylindrical layer of the softened composition is then cooled, either in air, or by passing through a water bath. The pressure sheath is thus obtained, made of a fluoropolymer compound having the structural characteristics of the composition according to formulation 1. Then, by well-known production steps, firstly the pressure armor layer is wound, formed from a winding of a shaped wire or a strip in a short-pitch helix, then the long-pitch tensile armor layer.

Thus, offshore or onshore flexible pipes for transporting hydrocarbons are produced, capable of withstanding high temperature and pressure in operation, typically up to 1000 bar and 130° C.

PVDF homopolymer, sometimes used alone for the pressure sheaths, has good high-temperature behavior but has the drawback of low ductility at low temperature. Now, during manufacture and installation of the pipe, it must be possible for the pressure sheath to be bent at low temperature (winter frosts, installation in cold zones, etc.) without being damaged. That is why PVDF homopolymer alone is not the most suitable for making the pressure sheaths of flexible pipes.

The flexible tubular pipes in question are mainly flexible pipes of the "unbonded" type. However, the flexible tubular structures according to the invention also include pipes of the "bonded" type.

According to another embodiment, longitudinal strips are formed by extrusion from the composition according to formulation 1. These strips of fluoropolymer compound are used in the flexible pipes for various functions, notably protection against wear and friction when they are interposed between the reinforcing, tensile or pressure layers. They are also used for thermal insulation and for protection of components that are sensitive to temperature or to aggressive chemicals, for example when they are wound in jointing turns, specifically between the carcass and the pressure sheath.

The composition according to formulation 1 is advantageously employed in the subsea umbilicals defined in standard ISO 13628-5. These umbilicals comprise at least one reinforcing layer and at least one layer of a fluoropolymer compound and generally include tube bundles and notably: pressure sheaths, pressure tubes, outer sheaths or strips in flexible pipes, sheaths or strips in electric or optical fiber cables, metal tubes lined internally or externally, rods for filling between components of the umbilical, or "fillers", intermediate or outer sheaths or strips surrounding the whole or part of the assembly of tubes and cables.

According to yet another aspect, the present invention relates to a tubular structure for oil exploitation, said tubular structure comprising at least one line, and at least one layer of a fluoropolymer compound, said fluoropolymer compound having a composition comprising on the one hand a poly(vinylidene fluoride) homopolymer and a copolymer of vinylidene fluoride and of a fluorinated comonomer and on the other hand a plasticizer. The proportion by weight of fluorinated comonomer in the copolymer is above 25%.

Thus, the invention relates to so-called "rigid" tubular pipes, used offshore. They are of the type of those described in the applicant's patent application WO 03/062691. They comprise a metal tube, inside which there is a polymer layer notably having the function of protecting the metal tube against corrosion. These tubular pipes are intended to be installed at sea by the methods of installation that are well known by a person skilled in the art such as J lay, S lay or the laying technique called "reeled lay". This last-mentioned technique consists of winding, on a motorized wheel of a pipelaying ship, a "rigid" tubular pipe prepared onshore, deforming it plastically before transporting it to the place of installation, where it is then unwound and straightened, to be installed at the oil field.

Abbreviations

The following abbreviations are used in the description and in the claims given hereunder:
VDF: vinylidene fluoride
PVDF: poly(vinylidene fluoride)
HFP: hexafluoropropylene
PMVE: perfluoro(methylvinyl)ether
PEVE: perfluoro(ethylvinyl)ether
PPVE: perfluoro(propylvinyl)ether
PFBE: perfluorobutylethylene
TFE: tetrafluoroethylene
CTFE: chlorotrifluoroethylene
FEP: fluoroethylenepropylene
NCR: average number of cycles to rupture as measured in the fatigue test

The invention claimed is:

1. A flexible tubular structure for oil exploitation, said flexible tubular structure comprising at least one reinforcing layer and at least one layer of a fluoropolymer compound, said fluoropolymer compound having a composition comprising a poly(vinylidene fluoride) homopolymer, a plasticizer, and 25 to 35% by weight of a vinylidene fluoride (VDF) and hexafluoropropylene (HFP) copolymer (VDF and HFP copolymer), the VDF and HFP copolymer being an elastomer that can be stretched at room temperature to twice its initial length and which, once released, quickly regains its initial length, to within 10% and consists of VDF and more than 25% by weight HFP.

2. The flexible tubular structure as claimed in claim 1, wherein said plasticizer is selected from dibutyl sebacate, dioctyl phthalate, N-n-butylsulfonamide, the polymeric polyesters and combinations thereof.

3. The flexible tubular structure as claimed in claim 1, wherein said plasticizer is present in said composition in a proportion by weight from 1 to 5%.

4. The flexible tubular structure as claimed in claim 1, wherein the proportion by weight of said HFP in said copolymer is: greater than or equal to 26%, and less than or equal to 40.

5. The flexible tubular structure as claimed in claim 1, wherein said fluoropolymer compound has a fatigue strength in the unaged state greater than or equal to 50000 cycles, and/or a fatigue strength in the state as aged for 1 month at 150° C. in air greater than or equal to 5000 cycles on average.

6. The flexible tubular structure as claimed in claim 1, wherein said fluoropolymer composition consists of said poly(vinylidene fluoride) homopolymer, said copolymer of VDF and of said HFP and said plasticizer.

7. The flexible tubular structure as claimed in claim 1, wherein said layer of said fluoropolymer compound forms a pressure sheath, whereas said reinforcing layer comprises profiles wound helically around said pressure sheath.

8. The flexible tubular structure as claimed in claim 1, wherein said layer of said fluoropolymer compound forms an intermediate protective sheath.

9. The flexible tubular structure as claimed in claim 1, wherein said layer of said fluoropolymer compound is formed from strips of said fluoropolymer compound wound in a helix.

10. The flexible tubular structure as claimed in claim 9, further comprising two reinforcing layers, whereas said strips of said fluoropolymer compound are wound helically between said two reinforcing layers.

11. The flexible tubular structure as claimed in claim 9, further comprising a pressure sheath and a metal carcass located inside said pressure sheath, whereas said strips of said fluoropolymer compound are wound helically between said carcass and said pressure sheath.

12. The flexible tubular structure as claimed in claim 1, wherein said copolymer of VDF and of said HFP is present in said composition in a proportion by weight from 25 to 35%.

13. The flexible tubular structure as claimed in claim 3, wherein said plasticizer is present in said composition in a proportion by weight from 2 to 3.5%.

14. The flexible tubular structure as claimed in claim 4, wherein the proportion by weight of said HFP in said copolymer is greater than or equal to 26%, and less than or equal to 37%.

15. The flexible tubular structure as claimed in claim 5, wherein said fluoropolymer compound has a fatigue strength in the unaged state greater than or equal to 100000 cycles on average and/or a fatigue strength in the state as aged for 1 month at 150° C. in air greater than or equal to 8000 cycles on average.

16. The flexible tubular structure as claimed in claim 1, wherein the proportion of HFP in said copolymer of VDF and HFP is 35% by weight.

* * * * *